United States Patent
Tonooka et al.

[11] Patent Number: 5,913,717
[45] Date of Patent: Jun. 22, 1999

[54] SPHERE POLISHING MACHINE

[75] Inventors: Katsuhisa Tonooka; Hiroyuki Nojima; Takeshi Kobayashi, all of Kanagawa, Japan

[73] Assignee: NSK Ltd., Tokyo, Japan

[21] Appl. No.: 08/998,552

[22] Filed: Dec. 24, 1997

[30] Foreign Application Priority Data

Dec. 25, 1996  [JP]  Japan .................................. 8-357111

[51] Int. Cl.⁶ .................................................. B24B 11/06
[52] U.S. Cl. ............................................ 451/282; 451/50
[58] Field of Search ............................ 451/282, 50, 267, 451/268

[56] References Cited

U.S. PATENT DOCUMENTS

| 3,545,139 | 12/1970 | Brany ............................................ 451/50 |
| 3,984,945 | 10/1976 | Messerschmidt ...................... 451/267 |
| 4,965,967 | 10/1990 | London .................................... 451/50 |

FOREIGN PATENT DOCUMENTS 6-91506  4/1994  Japan .............................. B24B 11/06

*Primary Examiner*—Robert A. Rose
*Attorney, Agent, or Firm*—Sughrue, Mion, Zinn, Macpeak & Seas, PLLC

[57] ABSTRACT

In a sphere polishing machine, workpiece balls in a ball passageways which are formed by guide grooves 5 formed in a stationary board 2 and guide grooves 1a formed in a rotary board 1 are moved along the ball passageways while being rotated by the rotary board 1, whereby the portion of the workpiece ball which is brought into contact with the guide groove 1a of the stationary board 1 in accordance with the inclination of the axis of rotation of the workpiece ball, is polished. On each of the ball passageways, a plurality of predetermined positions are selected at predetermined intervals, and relief grooves 6a, 6b and 6c are formed in guide groove portions of the stationary board which correspond the predetermined positions so that, when each of the workpiece balls passes through each of the predetermined positions, the inclination of the axis of rotation thereof is changed.

10 Claims, 4 Drawing Sheets

5,913,717

SPHERE POLISHING MACHINE

BACKGROUND OF THE INVENTION

This invention relates to a sphere (ball) polishing machine which is suitable for polishing a precise steel ball superior in low vibration characteristic which is employed for instance for a ball bearing.

In general, a sphere polishing machine for forming steel balls which are applied, for instance, to a ball bearing employs a circular conveyor to supply balls which are to be polished (hereinafter referred to as "workpiece balls", when applicable) to a sphere polishing machine body for the mass production of spheres (balls).

The sphere polishing machine with the circular conveyor will be described with reference to FIG. 1. FIG. 1 is a diagram showing the whole arrangement of a conventional sphere polishing machine.

An shown in FIG. 1, the sphere polishing machine, comprises: a circular conveyor 7 accommodating a number of workpiece balls 3; and a machine body which polishes the workpiece ball 3 (supplied from the circular conveyor 7) precisely spherical. In the circular conveyor 7, a number of workpiece balls 3 in it is led to an outlet by the rotation of a moving section (not shown). The outlet is connected to a chute 7a through which a workpiece ball led to the inlet 4a the machine body. Furthermore, the circular conveyor 7 has a chute 7b through which a workpiece ball discharged through the outlet 4b of the machine body is led to the inlet of the circular conveyor 7.

The machine body comprises a stationary board 2; and a rotary board 1 which is a polishing body for workpiece balls 3 and rotates coaxially with respect to the stationary board 2 while being pushed against the stationary board 2 with a predetermined polishing force. In the inner face of the rotary board 1 which confronts with the stationary board 2, a plurality of grooves (not shown) for receiving workpiece balls 3 are coaxially formed. Each of the grooves is uniform and continuous in the circumferential direction, and its section is similar to the radius of curvature of the workpiece balls 3. Similarly, in the inner face of the stationary board 2 which confronts with the rotary board 1, a plurality of grooves 5 for receiving workpiece balls 3 are coaxially formed. Each of the grooves 5 is uniform and continuous in the circumferential direction, and its section is similar to the radius of curvature of the workpiece balls 3. The grooves 5 of the stationary board 2 are confronted with those of the rotary board to form ball passageways for workpiece balls 3.

The workpiece balls 3 supplied to the inlet 4a through the chute 7a from the circular conveyor 7, are allowed to go into the ball passageways in the order of supply. Each workpiece ball 3 is moved along the ball passageway while being rotated by the rotation of the rotary board 1 and the predetermined pressure applied thereto by the rotary board 1. During the movement, the part or parts of the workpiece ball 3 which are brought into contact with the guide groove of the rotary board are polished. Whenever the workpiece ball moves through the ball passageway, the workpiece ball is polished once. The workpiece ball thus polished is returned through the chute 7b into the circular conveyor 7.

The polishing operation is performed predetermined times that workpiece balls 3 are supplied from the circular conveyor 7 into the machine body, and are polished by the machine body, and are then returned to the circular conveyor 7. This polishing operation performed repeatedly polishes the workpiece balls so that the workpiece balls are precisely spherical.

With the above-described sphere polishing machine, during the movement of a workpiece ball the inclination of the rotating axis of the workpiece ball is hold substantially constant in angle. Hence, a surface polishing locus of a workpiece ball per polishing operation is extended in a certain direction and considerably small in width, and therefore it is difficult to uniformly polish the surface of a workpiece ball with one polishing operation. In order to uniformly polished the surface of a workpiece ball, it is necessary to increase the number of times of the above-described polishing operation, which lowers the polishing efficiency of workpiece balls.

In order to overcome the above-described difficulty, the following system has been proposed in the art: The section of each of the grooves formed in the rotary board is continuously changed in the circumferential direction of the rotary board so that, as a work piece ball is moved along the groove, the contact point of the workpiece ball with the groove is shifted (Japanese Patent Unexamined Publication No. Hei. 6-91506. More specifically, the section of each of the grooves formed in the rotary board is continuously changed in the circumferential direction, whereby during movement of the workpiece ball the contact angle of the workpiece ball with the groove of the rotary board is continuously changed so that the workpiece ball is slipped with respect to the rotary board and the stationary board. This slip results in a skew motion that the inclination of rotating axis of the workpiece ball is continuously changed, whereby the surface of the workpiece ball is substantially uniformly polished by one polishing operation.

In the above-described polishing system, the slip provided between a workpiece ball and the rotary board and the stationary board depends on the difference in frictional force which is provided between the workpiece ball and the rotary board and the stationary board. Hence, it is difficult to positively obtain a skew motion which is sufficient for only one polishing operation to substantially uniformly polish the surface of the workpiece ball; in other words, it is difficult for only one polish operation to substantially polishing the surface of the workpiece ball.

SUMMARY OF THE INVENTION

Accordingly, it is an object of the invention to solve the above-described problem. More specifically, an object of the invention is to provide a sphere polishing machine which is able to substantially uniformly polish the surface of a workpiece ball by performing a polishing operation, which is constituted from the receiving of the workpiece ball till the discharging of the received workpiece ball, only once.

The foregoing object of the present invention has been achieved by the provision of a sphere polishing machine comprising:

a stationary board in one surface of which annular guide grooves are formed; and a rotary board in one surface of which annular guide grooves are formed, the rotary board being confronted with the stationary board in such a manner that the guide grooves of the rotary board are combined with the guide grooves of the stationary board to form annular ball passageways for workpiece balls, and wherein the workpiece balls are pressed by the stationary board and the rotary board so that the workpiece balls are held in the ball passageways, and the rotary board is coaxially turned with respect to the stationary board so that the workpiece balls in the ball passageways are moved along the ball passageways while being rotated, whereby portions of the workpiece balls which are in contact with the guide grooves are polished, wherein relief grooves for changing an inclination of the axis of rotation of the workpiece balls when each of the workpiece balls pass along the annular ball passageways are respectively formed on the annular guide grooves of the stationary board.

In the above-mentioned sphere polishing machine according to the present invention, on each of the ball passageways, a plurality of predetermined positions may be selected at predetermined intervals, the relief grooves may be formed in the annular guide grooves of the stationary board which correspond to the predetermined positions, and each of the relief grooves may have a predetermined length.

In addition, in the above-mentioned sphere polishing machine according to the present invention, the relief grooves comprise at least one of:

an inner relief groove which is so shaped in sectional configuration that the guide grove is expanded radially inwardly of the stationary board; and an outer relief groove which is so shaped in sectional configuration that the guide groove is expanded radially outwardly of the stationary board.

Further, in the above-mentioned sphere polishing machine according to the present invention, the relief grooves may comprise both of the inner relief groove and the outer relief groove, and the inner and outer relief grooves are alteratively arranged in a circumferential direction of the stationary board.

Furthermore, in the above-mentioned sphere polishing machine according to the present invention, the lengths (S) of the relief grooves may be determined so as to meet the following expressions:

$$S=\pi d(n+0.5)$$

where d indicates the diameter of the workpiece ball, and n defines an integer.

In the sphere polishing machine of the invention, as was described above, on the ball passageway, a plurality of predetermined positions are selected at predetermined intervals, and the relief grooves are formed in the guide groove portions of the stationary board which correspond to the predetermined positions so that, when each of the workpiece balls pass through each of the predetermined positions, the inclination of the axis of rotation thereof is changed. As the inclination of the axis of rotation of the workpiece ball changes, the portion of the workpiece ball which is brought into contact with the guide groove, namely, the polishing locus is changed. Hence, the surface of the workpiece ball can be substantially uniformly polished by only one polishing operation from the receiving of a workpiece piece ball until the discharging of the workpiece ball.

DETAILED DESCRIPTION OF THE PREFERRED EMBODIMENTS

A preferred embodiment of the invention will be described with reference to the accompanying drawings.

Figure 1:
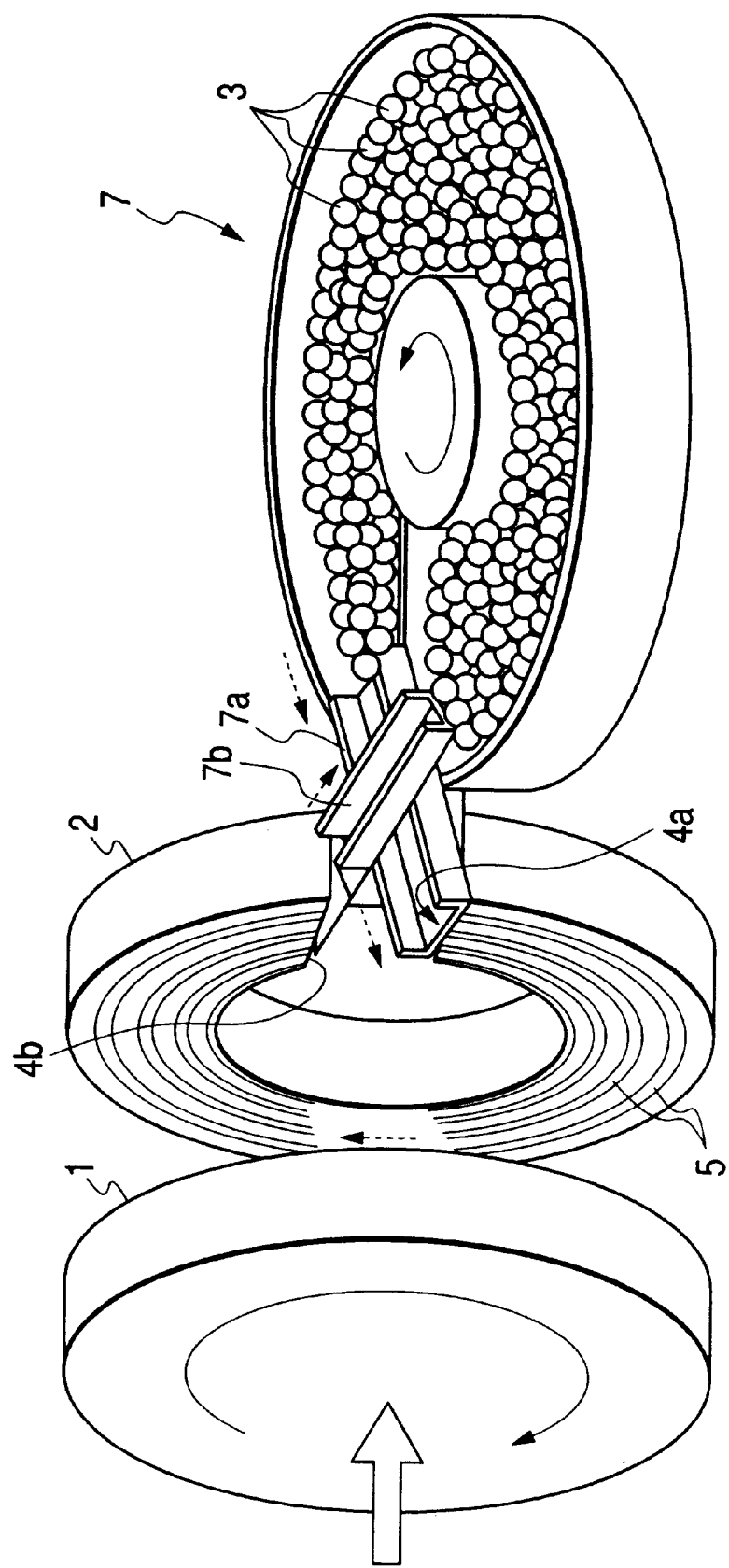
FIG. 1 is a perspective view showing the arrangement of a conventional sphere polishing machine.
Figure 2:
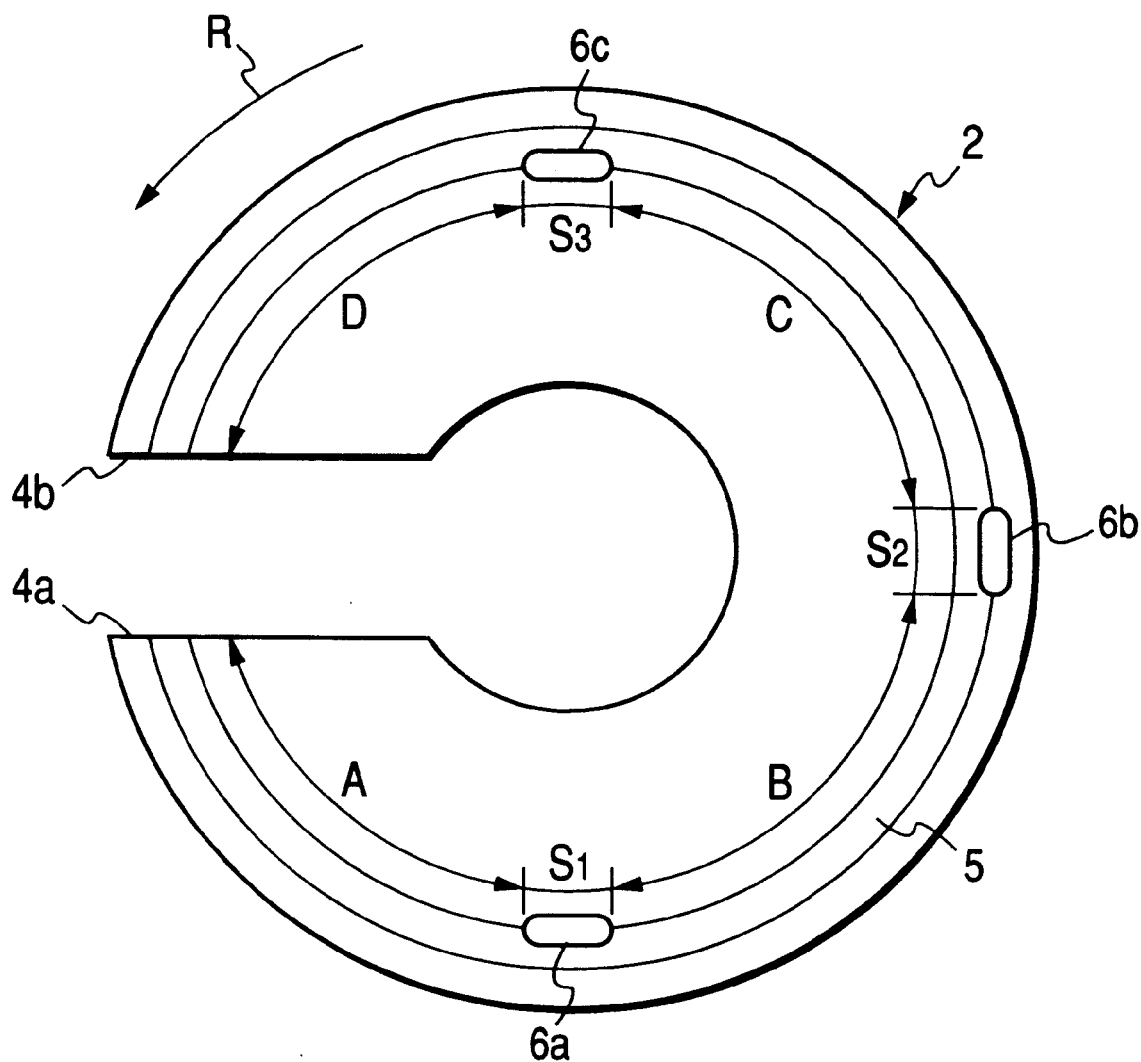
FIG. 2 is a plan view showing a stationary board in a sphere polishing machine, which constitutes an embodiment of the invention.
Figure 3A:
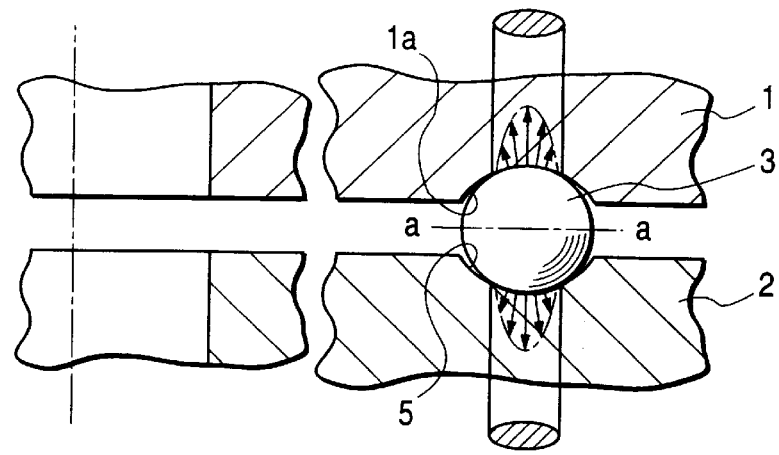
FIGS. 3(a)–3(c) for a description of the contact of a workpiece ball with a rotary board and the stationary board in the sphere polishing machine, in the embodiment of the invention.
Figure 3B:
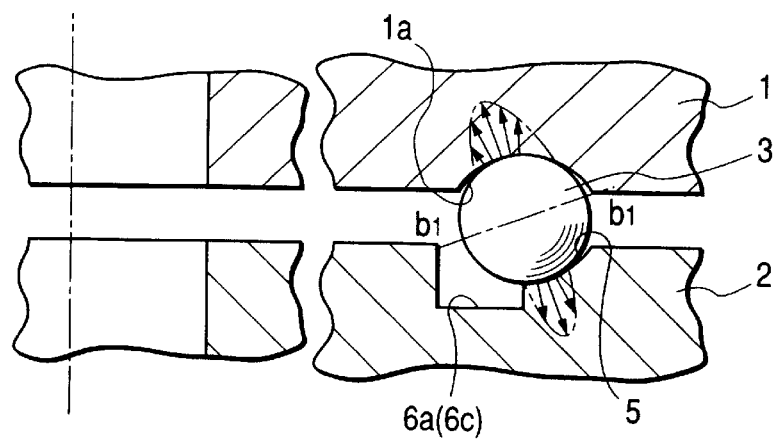
Figure 3C:
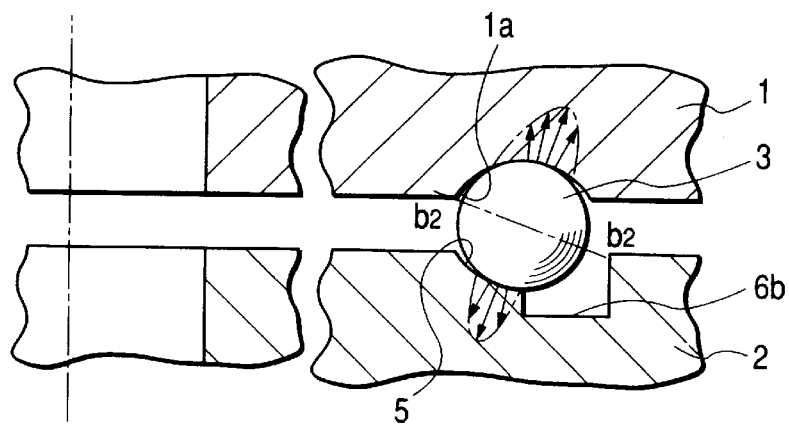
Figure 4A:
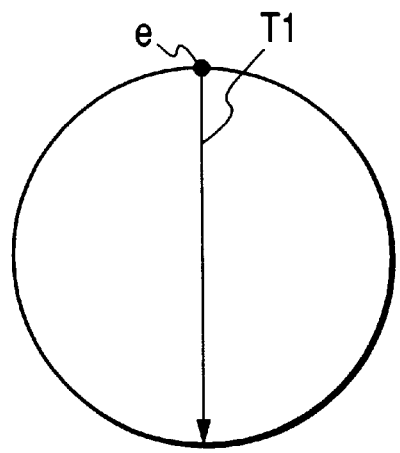
FIGS. 4(a)–4(c) are diagram for a description of a polishing locus on a workpiece ball in the sphere polishing machine, in the embodiment of the invention.
Figure 4B:
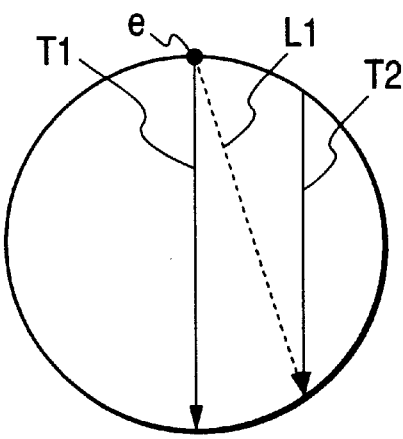
Figure 4C:
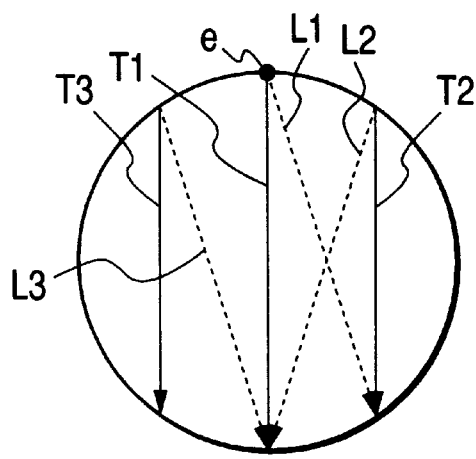

FIG. 2 is a plan view showing a stationary board in a sphere polishing machine, which constitutes the preferred embodiment of the invention. FIG. 3 is a diagram for a description of the contact of a workpiece ball with a rotary board and the stationary board in the sphere polishing machine, in the embodiment of the invention. FIG. 4 is a diagram for a description of the polishing locus on the workpiece ball in the sphere polishing machine, in the embodiment of the invention. Those figures show only essential parts of the sphere polishing machine, and the description of parts corresponding functionally to those already described with reference to FIG. 1 (the prior art) are therefore simplified or omitted.

A sphere polishing machine for the manufacture of steel balls which are employed, for instance, for ball bearings comprises: a circular conveyor (not shown) accommodating a number of workpiece balls; and a machine body adapted to accurately spherically polishing those workpiece balls supplied from the circular conveyor. The circular conveyor is equal in structure to the conventional one shown in FIG. 1.

The machine body, as shown in FIGS. 2 and 3, comprises: a stationary board 2; and a rotary board 1. The stationary board 2 has inlets 4a for receiving workpiece balls 3 from the circular conveyor, and outlets 4b for returning workpiece balls into the circular conveyor. The rotary board 1 is a polishing means, and turns coaxially with respect to the stationary board 2 while being pushed against the stationary board 2 by a predetermined force. In the surface of the rotary board 1 which confronts with the stationary board, as shown in FIG. 3 a plurality of grooves 1a (only one groove 1a shown) for receiving a workpiece ball 3 are coaxially formed. Each of the grooves coaxial 1a is uniform in section as viewed in the circumferential direction.

Similarly, in the surface of the stationary board 2 which confronts with the rotary board, as shown in FIGS. 2 and 3 a plurality of grooves 5 (only one groove 5 shown) for receiving a workpiece ball 3 are coaxially formed. The grooves 5 are accurately laid along the grooves 1a of the rotary board 1, thus forming ball passageways for workpiece balls 3. At the portions of each guide groove (hereinafter referred to as "guide groove portions", when applicable) of the stationary board 2 which correspond to a plurality of positions at predetermined angular intervals, relief grooves 6a, 6b and 6c are formed to change the inclination of the rotating axis of a workpiece ball 3. And the lengths of the relief groove (as viewed in the circumferential direction) are set to predetermined values, respectively. The sectional configurations of the relief grooves 6a, 6b and 6c are different from the sectional configuration of the remaining guide groove. Hereinafter, the term "guide groove 5" is intended to means the above-described "remaining guide groove" unless otherwise specified.

The positions and lengths of the relief grooves 6a, 6b and 6c are so determined that whenever the workpiece ball 3 passes through each of the relief grooves 6a, 6b and 6c, the inclination of the rotating axis of the workpiece ball 3 is changed. This will be described in more detail. As shown in FIG. 2, in the stationary board 2, the guide grooves 5 are formed which are annularly extended around the central axis of the stationary board 2 from the inlet 4a to the outlet 4b. The relief groove 6a is at a distance of A (in the circumferential direction) from the inlet 4a of the stationary board 2 and is integral with the guide groove 5. And its length in the circumferential direction is set to S1. The relief groove 6b is at a distance of B from the relief groove 6a (in the circumferential direction), and is integral with the guide groove 5. And its length in the circumferential direction is set to S2. The relief groove 6c is at a distance of C from the relief groove 6b (in the circumferential direction), and is integral with the guide groove 5. And its length in the circumferential direction is set to S3. The distance between the relief groove 6c and the outlet 4b (as viewed in the circumferential direction) is D.

The distances B and C, and the lengths S1, S2 and S3 of the relief grooves 6a, 6b and 6c are so determined as to meet the following expressions:

$$B = \pi d(n1 + \beta) \quad (1)$$

$$C = \pi d(n2 + \beta) \quad (2)$$

$$S1 = \pi d(n3 + \alpha) \quad (3)$$

$$S2 = \pi d(n4 + \alpha) \quad (4)$$

$$S3 = \pi d(n5 + \alpha) \quad (5)$$

d: the diameter of a workpiece ball n1, n2, n3, n4 and n5: the number of rotations of a workpiece ball $$0 < \alpha < 1, \quad 0 \leq \beta \leq 1$$

In the embodiment, $\alpha$ is set to "00.5", $\beta$ with respect to the distance B is set to "0.5", and $\beta$ with respect to the distance C is set to "0". The distances B and C are obtained with the numbers of rotations n1 and n2 of a workpiece ball set to one and the same value.

As shown in the part (a) of FIG. 3, at the distances A, B, C and D, the guide groove 5 is equal in sectional configuration to that of the guide groove 1a of the rotary board 1. As shown in the part (b) of FIG. 3, the relief grooves 6a and 6c are so shaped in sectional configuration that the guide groove 5 is expanded radially inwardly of the stationary board 2. The relief grooves 6b, as shown in the part (c) of FIG. 3, is so shaped in sectional configuration that the guide groove 5 is expanded radially outwardly of the stationary board 2.

In the embodiment, the relief grooves are substantially rectangular in section: however, the invention is not limited thereto or thereby. For instance, the relief grooves may be U-shaped in section.

Furthermore, in the embodiment, each ball passageway has three relief grooves. However, the number of relief grooves may be increased or decreased. In this case, the positions and lengths of the relief grooves are determined according to the number of relief grooves.

In addition, the distances B and C are determined with the number of rotations n1 and n2 of a workpiece ball set to one and the same value. However, the distances B and C may be determined with the number of rotations n1 and n2 of a workpiece ball set to different values.

Now, the behavior of a workpiece ball 3 in the sphere polishing machine will be described.

Workpiece balls 3 supplied through the inlet 4a from the circular conveyor are moved into the ball passageway in the order of supply, and are then moved in the direction of the arrow R (FIG. 2) along the ball passageway while being rotated by the rotation of the rotary board 1 and by the pressure applied thereto by the rotary board 1.

First, the workpiece ball 3 is moved along a ball passageway portion of the distance A. During this movement, as shown in the part (a) of FIG. 3 the contact stress of the workpiece ball 3 with the rotary board 1, and that of the same workpiece ball with the stationary board 2 are symmetrical with respect to the bottom of the guide groove 1a of the rotary board 1 and the bottom of the guide groove 5 of the stationary board 2. Hence, the workpiece ball 3 rotates around the axis of rotation a—a which is substantially in parallel with the stationary board 2, so that the contact conical portion (indicated by oblique lines) is polished. This will be described in more detail. As shown in the part (a) of FIG. 4, a polishing locus, that is, the portion of the workpiece ball 3 which is brought into contact with the guide groove 1a of the rotary board 1 is a locus T1 which is extended in one direction. Under the same contact condition, a polishing operation is continued along the locus T1. It is assumed that the portion of the workpiece ball 3 which is brought into contact with the guide groove 1a of the rotary board 1 is represented by a particular point e. The particular point e is moved along the, locus T1. And, at the outlet of the ball passageway portion of the distance A, the particular point p is located as shown in the part (a) of FIG. 4 (the upper position).

Thereafter, when the workpiece ball 3 enters a ball passageway portion where the relief groove 6a is located, as shown in the part (b) of FIG. 4 because of the change of the sectional configuration of the guide groove 5 over to the sectional configuration of the relief groove 6a the balance between the stress distribution of the workpiece ball 3 and the rotary board 1 and the stress distribution of the workpiece ball 3 and the stationary board 2 is affected. Hence, in order to correct the balance thus affected, the workpiece ball 3 itself changes the inclination of the axis of rotation; that is, the axis of rotation of the workpiece ball 3 becomes an axis b1—b1 which is different in inclination from the axis a—a. As, in the ball passageway portion where the relief groove 6a is located, the inclination of the axis of rotation of the workpiece ball 3 changes, the polishing locus of the workpiece ball 3 is changed.

More specifically, as shown in the part (b) of FIG. 4, the particular point e which, at the outlet of the ball passageway portion of the distance A, is on the locus T1 of the workpiece ball 3 (at the position shown in the part (a) of FIG. 4) is moved along a locus L1. If $\alpha$ is "0" in the above-described equation (3), and the length S1 of the relief groove 6a is set, then, at the outlet of the ball passageway portion where the relief groove 6a is located, the above-described particularly point e comes to a position where it intersects with the locus T1. Hence, when the axis of rotation of the workpiece ball 3 returns to the axis of rotation a—a at the ball passageway portion of the distance B (as described later), the particular point e returns onto the locus T1: that is, a locus with respect to the particular point e in the ball passageway portion of the distance B becomes the locus T1 in the ball passageway portion of the distance A. Hence, even if, by setting $\alpha$ in the above-described equation (3) to a value between "0" and "1", the axis of rotation of the workpiece ball 3 in the ball passageway portion where the relief groove 6a is located is returned to the axis of rotation a—a in the ball passageway portion of the distance B, the returning of the workpiece ball 3 to the polishing locus T1 is prevented. That is, in the embodiment, $\alpha$ is set to "0.5", and therefore when the particular point e goes half along the locus L1, it moves away from the ball passageway portion where the relief groove 6a is located. At this time instant, the position of the particular point e is at the intersection of the locus L1 and the locus T2. Therefore, when the axis of rotation of the workpiece ball 3 returns to the axis of rotation a—a in the ball passageway portion of the distance B, the polishing locus of the workpiece ball 3 becomes the locus T2.

When the workpiece ball 3 moves in the ball passageway portion of the distance B from the ball passageway portion where the relief groove 6a is located, as shown in the part (a) of FIG. 3 the contact stress of the workpiece ball 3 with the rotary board 1 and the contact stress of the workpiece ball 3 with the stationary board 2 are symmetrical with respect to the bottom 1a of the rotary board 1 and the bottom of the guide groove 5 of the stationary board 2. Therefore, the workpiece ball 3 is moved while being rotating around he axis of rotation a—a again, so that the portion of the workpiece ball 3 which contacts with the guide groove 1a of the rotary board 1 is polished. In the embodiment, as was described above, at the outlet of the ball passageway portion where the relief groove 6a is located the position of the particular point e is the intersection of the locus L1 and the locus T2 (cf. the part (b) of FIG. 4). Therefore, the particular point e is moved from that position onto the locus T2; that is, the polishing locus is the locus T2. On the other hand, β in Equation (1) is set to "0.5". Therefore, the distance B becomes a value with which the number of rotations of the workpiece ball corresponds to (integer+0.5) rotations, and at the outlet of the ball passageway portion of the distance B the particular point e is positioned at the intersection of the locus T2 (the part (c) of FIG. 4) and a locus L2 (described later).

Thereafter, when the workpiece ball 3 enters the ball passageway portion where the relief groove 6b is located, as shown in the part (c) of FIG. 4 because of the change of the sectional configuration of the guide groove 5 over to the sectional configuration of the relief groove 6b the balance between the stress distribution of the workpiece ball 3 and the rotary board 1 and the stress distribution of the workpiece ball 3 and the stationary board 2 is affected. Hence, in order to correct the balance thus affected, the workpiece ball 3 changes the inclination of the axis of rotation; that is, the axis of rotation of the workpiece ball 3 becomes an axis b2—b2 which is different in inclination from the axis of rotation a—a and the axis of rotation b1—b1. As, in the ball passageway portion where the relief groove 6b is located, the inclination of the axis of rotation of the workpiece ball 3 changes, the particular point e on the polishing locus of the workpiece ball 3 is shifted from the intersection of the locus T2 and the locus L2 onto the locus L2. In the embodiment, c in the above-described Equation (5) is set to a value between "0" and "1" (more specifically the value being 0.5), and therefore the length S2 of the relief groove 6b is determined. Hence, the position of the particular point e at the outlet of the ball passageway portion where the relief groove 6b is located, is at the intersection of the locus L1 and the locus T1 as shown in the part (c) of FIG. 4. Therefore, even if the axis of rotation of the workpiece ball 3 in the ball passageway portion where the relief groove 6b is located is returned to the axis of rotation a—a in the following ball passageway portion of the distance C, the polishing locus of the workpiece ball 3 will not return to the locus T2.

When the workpiece ball 3 enters the ball passageway portion of the distance C from the ball passageway portion where the relief groove 6b is located, similarly as in the case of the ball passageway portion of the distance A shown in the part (a) of FIG. 3 the stress distribution of the workpiece ball 3 and the guide groove 1a of the rotary board 1 and that of the workpiece ball 3 and the guide groove 5 of the stationary board 2 are symmetrical, and therefore the workpiece ball 3 is moved while being rotated around the axis of rotation a—a, so that the portion of the workpiece ball 3 which is in contact with the guide groove 1a of the rotary board 1 is polished. In the embodiment, as shown in the part (c) of FIG. 4, the position of the particular point e is shifted from the intersection of the locus L2 and the locus T1 onto the locus T1; that is, the polishing locus becomes the locus T1. Since β in the above-described Equation is set to "0", the distance C is a value with which the number of rotations of the ball passageway portion corresponds to the number of integer rotations, and at the outlet of the ball passageway portion of the distance the position of the particular point e is at the intersection of the locus T1 and the locus L3 (described later) shown in the part (c) of FIG. 4.

Next, when the workpiece ball 3 enters the relief groove 6c, as shown in the part (b) of FIG. 3 the workpiece ball 3 changes the inclination of the axis of rotation similarly as in the case of the ball passageway portion where the relief groove 6a is located, and moves along the aforementioned ball passageway portion. The length S3 of the relief groove 6c is set according to the above-described Equation (5), and therefore in the relief groove 6c the axis of rotation is the one b1—b1 which is different in inclination from the axis of the rotation a—a. In the relief groove 6c, the particular point e on the polishing locus of the workpiece ball 3, as shown in the part (c) of FIG. 4, moves from the intersection of itself and the locus T1 along the locus L3. The length S3 of the relief groove 6c is equal to the length S1, and therefore at the outlet of the relief groove 6c the particular point e takes the intersection of the locus L3 and the locus T3 (the intersection of the locus L3 and the locus T3 shown in the part (c) of FIG. 4), and the returning of the polishing locus of the workpiece ball to the locus T1 is prevented.

When the workpiece ball enters the ball passageway portion of the distance D from the relief grooves 6c, similarly as in the case of the ball passageway portion of the distance A (shown in the part (a) of FIG. 3) the workpiece ball moves on while rotating around the axis a—a again. In the embodiment, the particular point e is moved from the intersection of the locus L3 and the locus T3 (the part (c) of FIG. 4, and the polishing locus becomes the locus T3.

As was described above, when the workpiece ball 3 goes along the ball passageway once which is made up of the guide groove 1a of the rotary board 1 and the guide groove 5. of the stationary board 2 (including the relief grooves 6a, 6b and 6c), one polishing operation has boon carried out. Thereupon, the workpiece ball 3 thus polished is returned through the outlet 4b into the circular conveyor again. The polishing operation (that is, the supplying of a workpiece ball 3, the polishing of the workpiece ball 3 with the machine body and the returning the polished workpiece ball 3 to the circular conveyor is repeated a predetermined number of times so that the surface of each of the workpiece balls 3 is polished with high sphericity.

As is apparent from the above description, in the sphere polishing machine of the invention, whenever the workpiece ball 3 passes through each of the relief grooves 6a, 6b and 6c in the ball passageway, the inclination of the axis of rotation thereof is changed. As the inclination of the axis of rotation changes, the portion of the workpiece ball 3 which contacts the guide groove la of the rotary board 1, namely, the polishing locus is changed. Hence, the surface of the workpiece ball 3 can be substantially uniformly polished by only one polishing operation. As a result, the number of times of polishing operations per workpiece ball can be decreased; that is, the sphere polishing machine of the invention is high in work efficiency. In other words, the surface of a workpiece ball can be substantially uniformly polished; that is, the polishing machine of the invention is high in efficiency and in polishing accuracy (the workpiece ball thus polished is high in sphericity).

In the sphere polishing machine of the invention, as was described above, on the ball passageway, a plurality of predetermined positions are selected at predetermined intervals, and the relief grooves are formed in the guide groove portions of the stationary board which correspond the predetermined positions so that, when each of the workpiece balls pass through each of the predetermined positions, the inclination of the axis of rotation thereof is changed. As the inclination of the axis of rotation of the workpiece ball changes, the portion of the workpiece ball which is brought into contact with the guide groove, namely, the polishing locus is changed. Hence, the surface of the workpiece ball can be substantially uniformly polished by only one polishing operation of from the receiving of a workpiece piece ball until the discharging of the workpiece piece ball.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A sphere polishing machine comprising:
   a stationary board in one surface of which annular guide grooves are formed; and
   a rotary board in one surface of which annular guide grooves are formed, said rotary board being confronted with said stationary board in such a manner that said guide grooves of said rotary board are combined with said guide grooves of said stationary board to form annular ball passageways for workpiece balls,
   wherein said workpiece balls are pressed by said stationary board and said rotary board so that said workpiece balls are held in said ball passageways, and said rotary board is coaxially turned with respect to said stationary board so that said workpiece balls in said ball passageways are moved along said ball passageways while being rotated, whereby portions of said workpiece balls which are in contact with said guide grooves are polished, and
   wherein relief grooves for changing an inclination of the axis of rotation of the workpiece balls when each of said workpiece balls pass along said annular ball passageways are respectively formed adjacent said annular guide grooves of said stationary board, said relief grooves extending parallel with the annular guide grooves and comprising at least one of:
      an inner relief groove which is so shaped in sectional configuration that said guide groove is expanded radially inwardly of said stationary board; and
      an outer relief groove which is so shaped in sectional configuration that said guide groove is expanded radially outwardly of said stationary board.

2. The sphere polishing machine according to claim 1, in which lengths (S) of said relief grooves are so determined as to meet the following expression:

$$S=\pi d(n+0.5)$$

where d indicates the diameter of said workpiece ball, and n defines an integer.

3. The sphere polishing machine according to claim 1, in which said relief grooves comprise both of said inner relief groove and said outer relief groove, said inner and outer relief grooves are alternatively arranged in a circumferential direction of said stationary board, and lengths (S) of said relief grooves are so determined as to meet the following expression:

$$S=\pi d(n+0.5)$$

where d indicates the diameter of said workpiece ball, and n defines an integer.

4. A sphere polishing machine comprising:
   a stationary board in one surface of which annular guide grooves are formed; and
   a rotary board in one surface of which annular guide grooves are formed, said rotary board being confronted with said stationary board in such a manner that said guide grooves of said rotary board are combined with said guide grooves of said stationary board to form annular ball passageways for workpiece balls, each of said ball passageways including a plurality of predetermined positions located at predetermined intervals,
   wherein said workpiece balls are pressed by said stationary board and said rotary board so that said workpiece balls are held in said ball passageways, and said rotary board is coaxially turned with respect to said stationary board so that said workpiece balls in said ball passageways are moved along said ball passageways while being rotated, whereby portions of said workpiece balls which are in contact with said guide grooves are polished, and
   wherein relief grooves for changing an inclination of the axis of rotation of the workpiece balls when each of said workpiece balls pass along said annular ball passageways are respectively formed adjacent said annular guide grooves of said stationary board at positions which correspond to said predetermined positions, said relief grooves having predetermined lengths (S) and being shifted by a constant distance either radially inward or radially outward of said annular guide grooves.

5. The sphere polishing machine according to claim 4, in which said lengths (S) of said relief grooves are so determined as to meet the following expression:

$$S=\pi d(n+0.5)$$

where d indicates the diameter of said workpiece ball, and n defines an integer.

6. The sphere polishing machine according to claim 1, in which said relief grooves comprise both of said inner relief groove and said outer relief groove, and said inner and outer relief grooves are alternatively arranged in a circumferential direction of said stationary board, said relief grooves having lengths (S) so determined as to meet the following expression:

$$S=\pi d(n+0.5)$$

where d indicates the diameter of said workpiece ball, and n defines an integer.

7. A sphere polishing machine comprising:
   a stationary board in one surface of which annular guide grooves are formed; and a rotary board in one surface of which annular guide grooves are formed, said rotary board being confronted with said stationary board in such a manner that said guide grooves of said rotary board are combined with said guide grooves of said stationary board to form annular ball passageways for workpiece balls, wherein said workpiece balls are pressed by said stationary board and said rotary board so that said workpiece balls are held in said ball passageways, and said rotary board is coaxially turned with respect to said stationary board so that said workpiece balls in said ball passageways are moved along said ball passageways while being rotated, whereby portions of said workpiece balls which are in contact with said guide grooves are polished, wherein relief grooves for changing an inclination of the axis of rotation of the workpiece balls when each of said workpiece balls pass along said annular ball passageways are respectively formed on said annular guide grooves of said stationary board, said relief grooves comprising at least one of:

an inner relief groove which is so shaped in sectional configuration that said guide groove is expanded radially inwardly of said stationary board; and an outer relief groove which is so shaped in sectional configuration that said guide groove is expanded radially outwardly of said stationary board;

wherein said relief grooves have lengths (S) so determined as to meet the following expression:

$$S=\pi d(n+0.5)$$

where d indicates the diameter of said workpiece ball, and n defines an integer.

8. A sphere polishing machine comprising:

a stationary board in one surface of which annular guide grooves are formed; and a rotary board in one surface of which annular guide grooves are formed, said rotary board being confronted with said stationary board in such a manner that said guide grooves of said rotary board are combined with said guide grooves of said stationary board to form annular ball passageways for workpiece balls, said ball passageways each including a plurality of predetermined positions which are selected at predetermined intervals, wherein said workpiece balls are pressed by said stationary board and said rotary board so that said workpiece balls are held in said ball passageways, and said rotary board is coaxially turned with respect to said stationary board so that said workpiece balls in said ball passageways are moved along said ball passageways while being rotated, whereby portions of said workpiece balls which are in contact with said guide grooves are polished, wherein relief grooves for changing an inclination of the axis of rotation of the workpiece balls when each of said workpiece balls pass along said annular ball passageways are respectively formed on said annular guide grooves of said stationary board at positions which correspond to said predetermined positions, said relief grooves comprising at least one of:

an inner relief groove which is so shaped in sectional configuration that said guide groove is expanded radially inwardly of said stationary board; and an outer relief groove which is so shaped in sectional configuration that said guide groove is expanded radially outwardly of said stationary board;

wherein said relief grooves have lengths (S) so determined as to meet the following expression:

$$S=\pi d(n+0.5)$$

where d indicates the diameter of said workpiece ball, and n defines an integer.

9. A sphere polishing machine comprising:

a stationary board in one surface of which annular guide grooves are formed; and a rotary board in one surface of which annular guide grooves are formed, said rotary board being confronted with said stationary board in such a manner that said guide grooves of said rotary board are combined with said guide grooves of said stationary board to form annular ball passageways for workpiece balls, and wherein said workpiece balls are pressed by said stationary board and said rotary board so that said workpiece balls are held in said ball passageways, and said rotary board is coaxially turned with respect to said stationary board so that said workpiece balls in said ball passageways are moved along said ball passageways while being rotated, whereby portions of said workpiece balls which are in contact with said guide grooves are polished, wherein relief grooves for changing an inclination of the axis of rotation of the workpiece balls when each of said workpiece balls pass along said annular ball passageways are respectively formed on said annular guide grooves of said stationary board, said relief grooves comprising both:

inner relief grooves which are so shaped in sectional configuration that said guide groove is expanded radially inwardly of said stationary board; and outer relief grooves which are so shaped in sectional configuration that said guide groove is expanded radially outwardly of said stationary board;

wherein said inner and outer relief grooves are alternatively arranged in a circumferential direction of said stationary board, said relief grooves having lengths (S) so determined as to meet the following expression:

$$S=\pi d(n+0.5)$$

where d indicates the diameter of said workpiece ball, and n defines an integer.

10. A sphere polishing machine comprising:

a stationary board in one surface of which annular guide grooves are formed; and a rotary board in one surface of which annular guide grooves are formed, said rotary board being confronted with said stationary board in such a manner that said guide grooves of said rotary board are combined with said guide grooves of said stationary board to form annular ball passageways for workpiece balls, said ball passageways each including a plurality of predetermined positions which are selected at predetermined intervals, wherein said workpiece balls are pressed by said stationary board and said rotary board so that said workpiece balls are held in said ball passageways, and said rotary board is coaxially turned with respect to said stationary board so that said workpiece balls in said ball passageways are moved along said ball passageways while being rotated, whereby portions of said workpiece balls which are in contact with said guide grooves are polished, wherein relief grooves for changing an inclination of the axis of rotation of the workpiece balls when each of said workpiece balls pass along said annular ball passageways are respectively formed on said annular guide grooves of said stationary board at positions which correspond to said predetermined positions, said relief grooves comprising both:

inner relief grooves which are so shaped in sectional configuration that said guide groove is expanded radially inwardly of said stationary board; and outer relief grooves which are so shaped in sectional configuration that said guide groove is expanded radially outwardly of said stationary board;

wherein said inner and outer relief grooves are alternatively arranged in a circumferential direction of said stationary board, said relief grooves having lengths (S) so determined as to meet the following expression:

$$S=\pi d(n+0.5)$$

where d indicates the diameter of said workpiece ball, and n defines an integer.

* * * * *